UNITED STATES PATENT OFFICE.

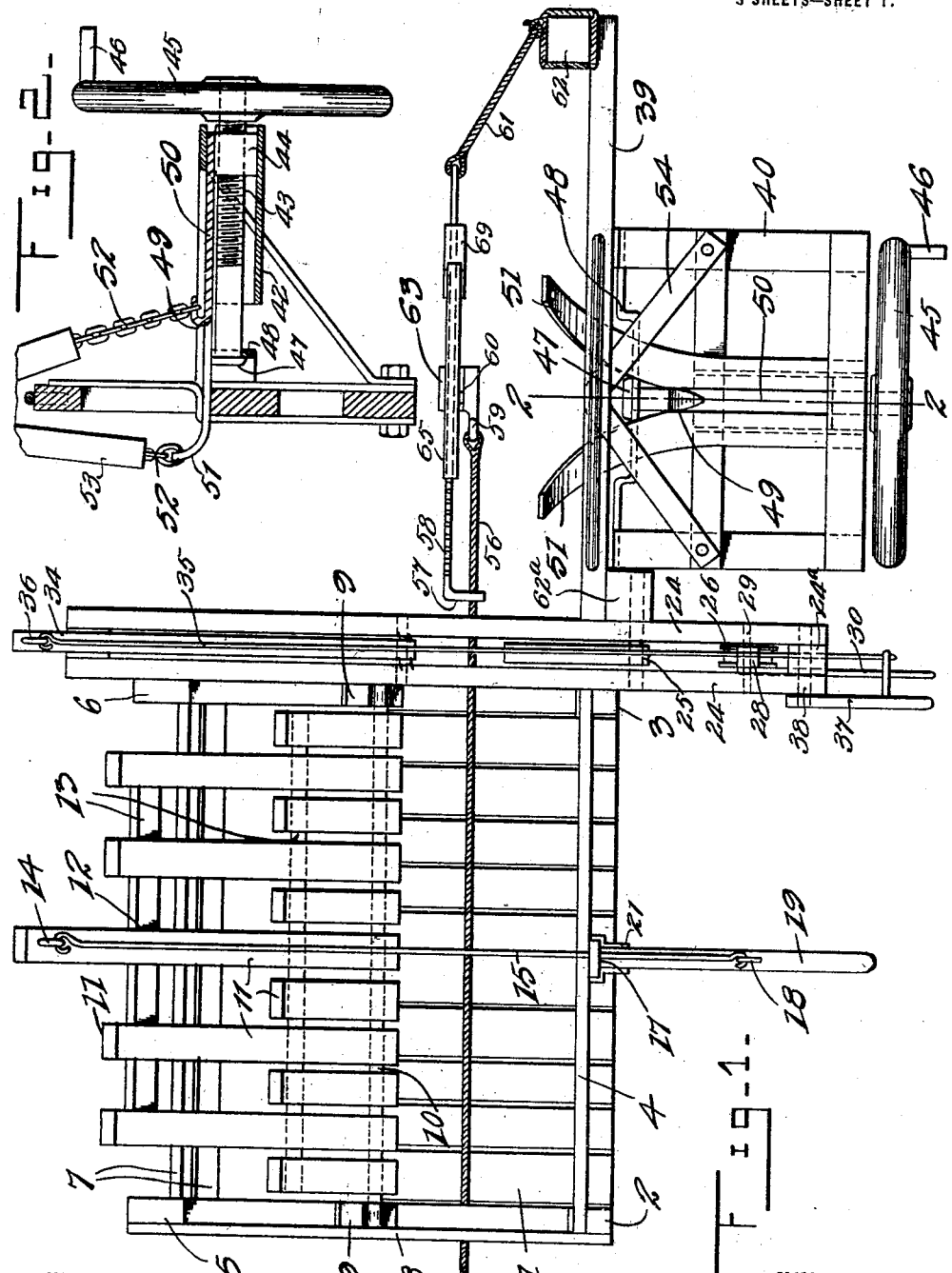

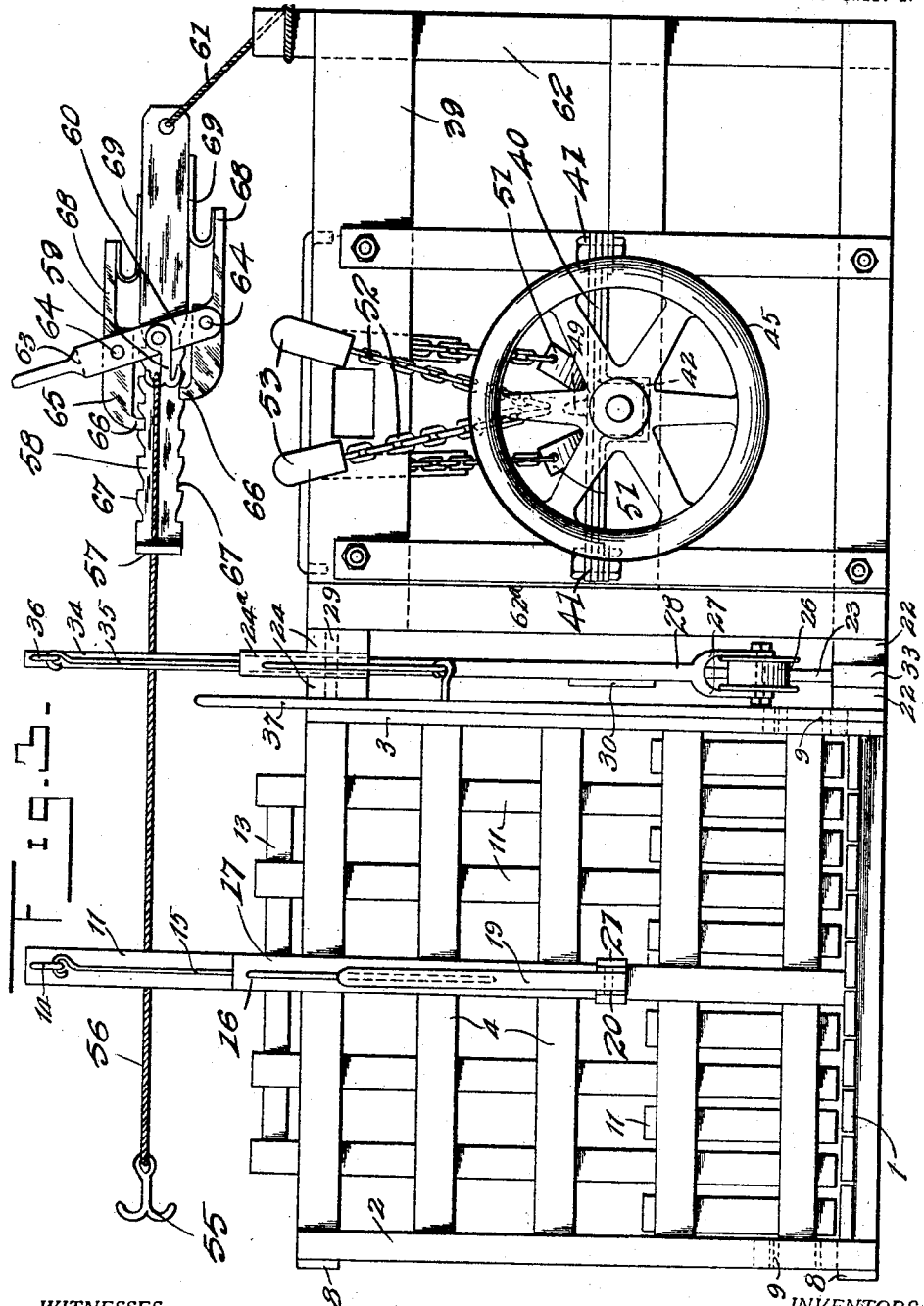

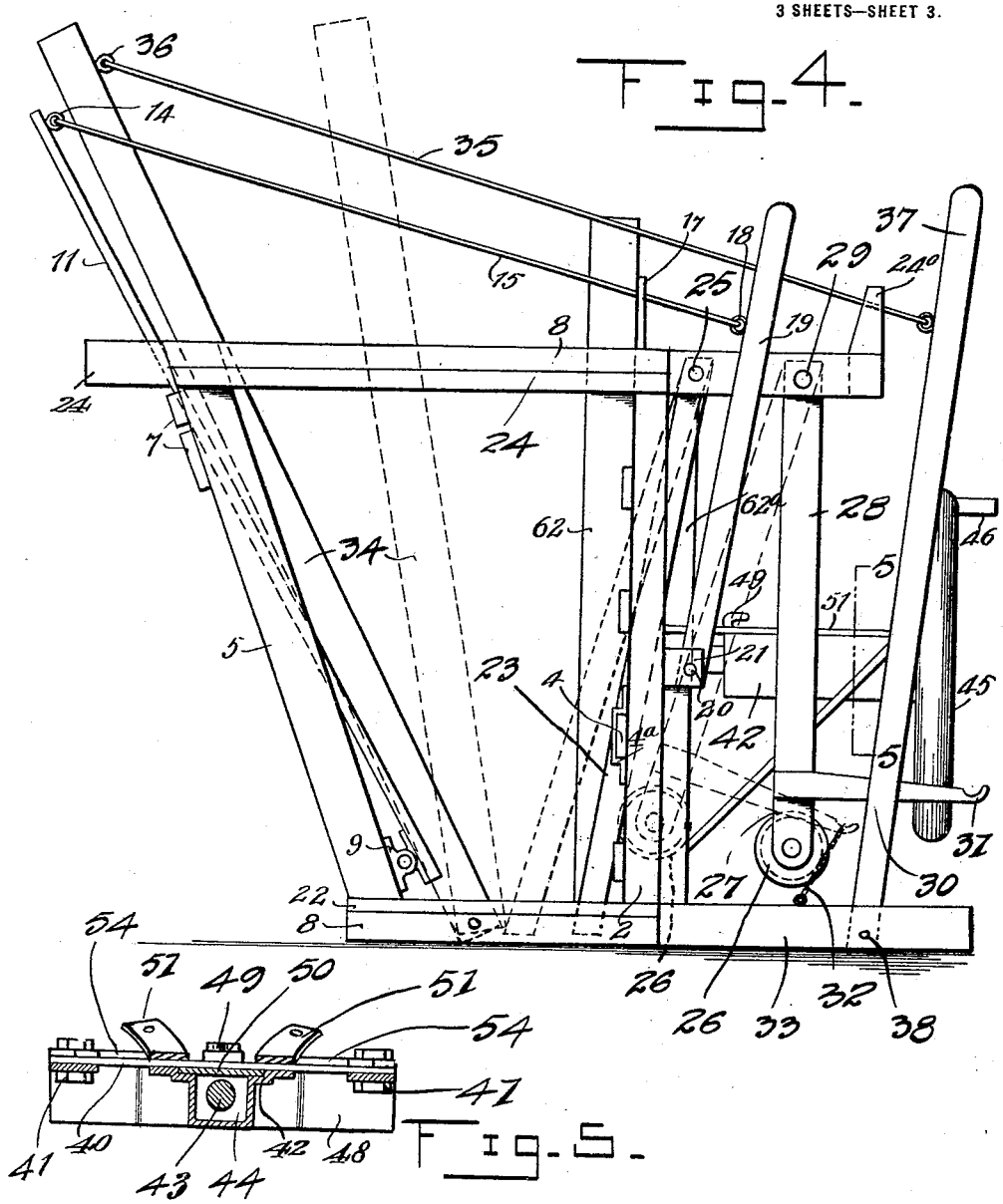

GEORGE L. HUFFMAN, OF RYE VALLEY, AND GEORGE W. GILLASPY, OF BAKER, OREGON.

ANIMAL-HOLDING DEVICE.

1,198,232.  Specification of Letters Patent.  Patented Sept. 12, 1916.

Application filed September 23, 1914. Serial No. 863,160.

*To all whom it may concern:*

Be it known that we, GEORGE L. HUFFMAN, a citizen of the United States, residing at Rye Valley, in the county of Baker and State of Oregon, and GEORGE W. GILLASPY, a citizen of the United States, residing at Baker, in the county of Baker and State of Oregon, have invented certain new and useful Improvements in Animal-Holding Devices; and we do hereby declare the following to be a full, clear, and exact description of the invention, such as will enable others skilled in the art to which it appertains to make and use the same.

This invention comprehends certain new and useful improvements in animal holding devices, and has for its primary object to provide a device of this character which will be constructed in such manner that cattle and the like may be held firmly during the operation of dehorning or branding the same.

The invention has for another object to provide an animal holding device of this character which will be of such construction that the animal may be readily drawn into and held by the device.

The invention has for a further object to provide an animal holding device which may be readily operated to bring the movable parts thereof into clamping engagement with the body or head of the animal, or move said movable parts away from the body and head of the animal.

The invention has for a still further object to generally improve and simplify the construction and operation of devices of this character and increase the efficiency thereof without materially increasing the cost of the same.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawings, in which:

Figure 1 is a top plan view of the device. Fig. 2 is a detail transverse vertical section on the plane of line 2—2 of Fig. 1. Fig. 3 is a side elevation of the device. Fig. 4 is a rear end elevation. Fig. 5 is a detail vertical section on the plane of line 5—5 of Fig. 4.

Referring more particularly to the drawings, in which similar reference characters designate corresponding parts throughout the several views, 1 designates a platform from one forward corner and one rear corner of which extend upwardly the corner posts 2 and 3 respectively, which have the longitudinal side strips 4 secured thereto to form one side of the body of the device, it being understood that the posts 2 and 3 extend vertically, thereby providing the vertical side. Metal strips 4ª are secured to the corner posts 2 and 3 to slidably receive one of the side strips 4 to permit removal thereof. Projecting upwardly and outwardly on an incline from the remaining forward and rear corners of the platform 1 are the front and rear outwardly and upwardly inclined corner posts 5 and 6 respectively to the outer face of which are secured the horizontal strips 7 adjacent the upper ends of said posts 5 and 6 to form the inclined stationary side of the body of the device. Rear corner posts 2 and 5 are connected by the transverse horizontal bars 8.

Positioned upon the inner faces of the inclined corner posts 5 and 6 adjacent the lower ends thereof are the bearings 9 in the opposite ends of which are rotatably mounted the opposite ends of the rock shaft 10 which extends through the lower ends of the transverse strips of the movable or swinging side wall 12 of the body which also includes horizontal strips 13 connecting the upper ends of the transverse strips 11, some of which are short while the others are long, as will be readily understood by referring to the drawings.

The central transverse strip 11 is extended at its upper end beyond the remaining strips 11 and has an eye 14 secured to its inner face adjacent its upper extended end with one end of an operating rod 15 engaged therein, said operating rod 15 extending through a guide opening in an upstanding guide strip 17 secured to the platform 1 and the outer face of the horizontal strips 4, the remaining end of the operating rod 15 being engaged in an eye 18 secured to one face of an operating lever 19. The lower end of the operating lever 19 is pivoted, as shown at 20, to the bracket 21 secured to said guide strip 17.

It will be evident that when an animal is upon the platform 1, the lever 19 may be readily operated to swing the clamping side 12 toward the vertical stationary side of the body of the device to bring both the vertical stationary side and the clamping side 12 into engagement with the sides of the animal's body to clamp the animal against movement in either direction upon the platform 1.

Secured to the front end of the platform 1 and extending transversely of the same are the spaced guide strips 22 between which is slidably engaged the lower end of a stanchion bar 23 which has its upper end pivoted between the upper spaced guide strips 24, as shown at 25. The upper spaced guide strips 24 are secured to the front corner standards 3 and 6 and positioned above the lower spaced guide strips 22. The lower end of the stanchion bar 23 may be readily forced inwardly by means of a wheel 26, which is mounted in the supporting arms 27 secured to the lower end of the pivoted bar 28 which has its upper end pivoted between the upper spaced guide strips 24, as clearly shown at 29. The bar 28 may be readily swung upon its pivot 29 by means of the arm 30 projecting outwardly from the lower end of said bar 28 and having a hook 31 formed thereon to receive one of the links of a chain 32 which has one end secured to the upper face of a base bar 33 projecting outwardly from between the ends of the lower spaced guide strips 22 to secure the bar 28 against outward movement, thereby retaining the wheel 26 in engagement with the lower portion of the stanchion bar 23 to prevent the same from moving outwardly after being forced inwardly by said wheel 26.

It will be understood that when the animal is in position upon the platform 1, the animal's neck extends below the upper guide strips 24 and between the stanchion bar 23 and a second stanchion bar 34, which has its lower end pivoted between the lower guide strips 22, while its upper portion is slidably engaged between the upper guide strips 24. The stanchion bar 34 is adapted to be swung toward the stanchion bar 23 by means of an operating rod 35 which has one end pivoted to the upper portion of said stanchion bar 34, as shown at 36, while the opposite end of said operating rod 35 extends through a guide opening in the guide member 24$^a$, secured to the upper guide strips 24, and is pivoted to the upper portion of the operating lever 37, which in turn has its lower end pivoted to the base bar 33, as shown at 38, whereby said operating lever 37 may be swung outwardly to draw the stanchion bar 34 toward the stanchion bar 23. It will be understood that movement of the operating lever 37 in the opposite direction will cause a reverse movement of the operating rod 35 and stanchion bar 34 to release the neck and head of the animal. When the bars 23 and 34 are in their innermost or normal positions, however, the animal will be caused to hold its head upwardly and will be prevented from drawing its head rearwardly or forcing its body forwardly on account of engagement of its withers with the stanchion bars 34 and 23. Referring to the drawing it will be readily seen that animals may be readily held against movement during the operation of branding or dehorning the animal. In order to more securely hold the animal's head during the operation of dehorning the animal, however, I have provided a forwardly directed supporting frame 39 having a vertical post 62$^a$ secured between the upper and lower guides, said supporting frame is substantially vertical and in alinement with the vertical stationary side of the body of the device and serves to support additional means for holding the animal's head against movement. This additional head holding means includes a horizontal frame 40 which projects from about the vertical center of the vertical supporting frame 39, as shown in Fig. 3. This horizontal frame 40 has a screw inclosing and protecting casing 42 secured to its under face and extending toward the vertical supporting frame 39, said screw inclosing and protecting casing 42 having positioned longitudinally therein the screw 43, which is threaded through a movable block 44 positioned in said inclosing and protecting casing 42 and prevented from rotating by said casing.

It will be evident that upon rotation of the screw 43 by the operating wheel 45 positioned upon its forward end and having a crank arm 46 projecting therefrom, said screw will be turned upon its swiveled inner end 47 mounted in the offset central portion of a supporting plate 48 secured to said frame 39 immediately below the frame 40, thereby causing the block 44 to move longitudinally in the casing 42 to vary the position of the bent back or hook end 49 of the arm 50 projecting from the block 44 toward the frame 39.

It will be readily seen that as the removable block 44 is caused to move toward the outer end of the casing 42, the head encircling chains will be tightened, one end of each chain being secured to the turnback or hook end 49 of the arm 50. The opposite ends of said head engaging chains are secured to the upturned free ends of the diverging arms 51 secured to the horizontal supporting frame 40, said head engaging chains being designated by the numerals 52 and inclosed in the flexible tubes 53. One of the chains is engaged across the nose of the animal below the animal's eyes while the other chain is engaged over the animal's head rearwardly of its horns, and the tubes 53 will prevent chafing of the animal.

It will be understood that the horizontal frame 40 may be braced in any suitable manner, such as by the brace bars 54 secured diagonally upon the same and connected to the horizontal frame 40 and the vertical supporting frame 39 by bolts 41. Should the animal be balky and hard to get upon the platform 1, the double hook, or anchor hook, 55 may be engaged back of the animal's horns to draw the animal upon the platform 1. The hook 55 is secured upon the free end of the rope 56 which has its opposite end secured through the guide opening formed in the right angled free end 57 of the double rack bar 58, while the remaining end of said rope 56 is secured to the double hook 59 pivoted to the lever 60. The lever 60 is positioned upon one side of the double rack bar 58 which has its rear end secured to the rope 61 fastened to the rear vertical post 62 of the vertical supporting frame 39. Positioned upon the opposite side of the double rack bar 58 and connected with the lever 60 with which it is parallel, is a plate 63, connected with the lever 60 by the rivets or pins 64 which serve as pivots for the pawls 65 which have their working ends 66 engaged with the teeth 67 upon the opposite longitudinal edges of the double rack bar 58. The pawls 65 have reduced rear ends 68 to which are secured the turned back end of the springs 69 which have their main portions resting upon the smooth rear portions of the longitudinal edges of said double rack bar 58 to resiliently retain the working ends 66 of said pawl 65 with the teeth 67 of said double rack bar 58, whereby upon operation of the lever 60 in either direction, the rope 56 and hooks 55 will be drawn rearwardly to draw the animal upon the platform 1.

From the foregoing it will be clearly apparent that this device will serve to securely hold animals of various sizes during such operations as branding, and dehorning the animals without injury to the animal.

While we have shown and described the preferred embodiment of our invention, it will be understood that minor changes in the details of construction, combination and arrangement of parts may be made without departing from the spirit and scope of the invention as claimed or sacrificing any of the advantages thereof.

What is claimed is:

1. A device of the class described including a frame provided with a lower transverse guide, a stanchion pivoted at its upper end and at its lower end operating in the guide, a pendant oscillatory lever pivoted at its upper end to the frame and provided at its lower portion with a wheel for engaging the stanchion bar, said pendant lever being also provided with an outwardly projecting arm having a hookshaped portion, and a flexible connection secured to said transverse guide and provided with means for engaging the hook shaped portion of the arm for retaining the shank bar in its engaging position.

2. A device of the class described comprising a platform, a stationary vertical side positioned upon said platform, an inclined stationary side opposite said vertical stationary side, a clamping side pivoted upon said inclined stationary side, and adapted for coöperation with the vertical stationary side to clamp the body of an animal against movement when said animal is in position upon the platform, means for moving the pivoted clamping side toward the vertical stationary side, upper and lower guide strips at the front end of said platform, stanchion bars pivoted between said guide strips, means for moving the lower end of one of said stanchion bars inwardly, means for moving the upper end of the remaining stanchion bar inwardly, means for locking the lower end of the first mentioned stanchion bar in its innermost position, a vertical supporting frame projecting forwardly from the platform and in alinement with the vertical stationary side positioned upon said platform, animal head encircling chains, coverings for said chains, stationary arms, supporting means for said arms carried by said vertical supporting frame, one end of each chain being connected with the stationary supporting arms, a movable supporting arm, the remaining ends of said chains being connected with said movable supporting arm, means for moving said movable arm laterally, supporting and guiding means for the last-mentioned means, a horn engaging member, and means connected with the front post of the vertical supporting frame for drawing said horn engaging member forwardly.

3. A device of the class described including a frame; horizontally divergent arms secured to said frame; an adjusting screw mounted exteriorly of the frame; a block engaged by the adjusting screw and having an arm extending through the frame, to the inner face thereof; and flexible means connected with said horizontally diverging arms and the arm carried by said block, said flexible means being adjusted by said screw.

4. A device of the class described including a frame, a casing extending from the outside of the frame, a block guided in the casing and provided with an arm extending through the frame to the inner side thereof, said arm being provided at the inner side of the frame with a bent back portion, horizontally diverging arms secured to said frame, flexible connections secured to the horizontally diverging portions at the inner side of the frame and connected with said bent back portion of the arm and extending upwardly therefrom, and a screw operating in the casing and engaging the block for adjusting the flexible connections to clamp the head of an animal against the frame.

In testimony whereof I affix my signature in presence of two witnesses.

GEORGE L. HUFFMAN.

Witnesses:
MILDRED SINCLAIR,
C. T. GODWIN.

In testimony whereof I affix my signature in presence of two witnesses.

GEORGE W. GILLASPY.

Witnesses:
M. INEZ GODWIN,
C. T. GODWIN.

Copies of this patent may be obtained for five cents each, by addressing the "Commissioner of Patents, Washington, D. C."